US012803410B2

(12) United States Patent
Ma et al.

(10) Patent No.: US 12,803,410 B2
(45) Date of Patent: Nov. 17, 2026

(54) METHOD FOR CONTROLLING POWER ADAPTER AND POWER ADAPTER

(71) Applicant: Delta Electronics (Shanghai) CO., LTD., Shanghai (CN)

(72) Inventors: Kehua Ma, Shanghai (CN); Daofei Xu, Shanghai (CN); Haitao Zhang, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 234 days.

(21) Appl. No.: 18/815,887

(22) Filed: Aug. 27, 2024

(65) Prior Publication Data

US 2025/0096665 A1 Mar. 20, 2025

(30) Foreign Application Priority Data

Sep. 15, 2023 (CN) ......................... 202311198690.1

(51) Int. Cl.

*H02M 1/00* (2007.01)
*H02M 3/335* (2006.01)
*H02M 7/217* (2006.01)

(52) U.S. Cl.

CPC ...... *H02M 1/0012* (2021.05); *H02M 3/33515* (2013.01); *H02M 7/2176* (2013.01)

(58) Field of Classification Search

CPC ........... H02M 1/0012; H02M 3/33507; H02M 3/33515; H02M 3/33523; H02M 7/2176
See application file for complete search history.

(56) References Cited

U.S. PATENT DOCUMENTS

2015/0257226 A1* 9/2015 Shteynberg ............ H05B 45/20 315/186
2024/0146172 A1* 5/2024 Ma ...................... H02M 1/0009

FOREIGN PATENT DOCUMENTS

CN 105634264 B 1/2018
CN 115733374 A 3/2023

* cited by examiner

*Primary Examiner* — Jue Zhang
(74) *Attorney, Agent, or Firm* — Qinghong Xu

(57) ABSTRACT

The present disclosure provides a method for controlling a power adapter and a power adapter, and relates to the field of power technologies. The method includes: obtaining a real-time value of a bus voltage of the power adapter; matching the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals VI to VN correspond to N different output power control values P1 to PN; and adjusting, according to the real-time control voltage interval, an output power command value of the power adapter to an output power control value corresponding to the real-time control voltage interval.

12 Claims, 4 Drawing Sheets

METHOD FOR CONTROLLING POWER ADAPTER AND POWER ADAPTER

CROSS REFERENCE

The present application is based on and claims priority to Chinese Patent Application No. 2023111986901, filed on Sep. 15, 2023, the entire contents of which are incorporated herein by reference.

TECHNICAL FIELD

The present disclosure relates to the field of power technologies, and in particular, to a method for controlling a power adapter and a power adapter.

BACKGROUND

Alternating Current (AC)/Direct Current (DC) power adapter architectures typically include two main parts, rectification and DC to DC. As shown in FIG. 1, a function of the rectification is to convert an alternating current to a direct current into a voltage Vbus, and the DC to DC part converts the voltage Vbus to a target voltage Vout. An important indicator for whether an electrical device can operate normally is heat dissipation. A fixed device has its fixed heat dissipation capability. One of conditions for the long-term stable operation of the device is that an overall power consumption of the device does not exceed the maximum heat dissipation capability of the device. For example, when an operating efficiency of a 45 W power supply is 90%, a housing temperature just meets safety regulations and is in a critical state, resulting in a loss of 5 W. This 5 W is the heat dissipation capability of the device, and one of essential conditions that this power supply can be normally used is that the loss is less than 5 W.

It should be noted that the information disclosed in the Background section above is only for enhancing the understanding of the background of the present disclosure, and thus may include information that does not constitute prior art known to those of ordinary skill in the art.

SUMMARY

The present disclosure provides a method for controlling a power adapter and a power adapter.

According to a first aspect of the present disclosure, there is provided a method for controlling a power adapter, including:

obtaining a real-time value of a bus voltage of the power adapter;

matching the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals V1 to VN correspond to N different output power control values P1 to PN; and adjusting, according to the real-time control voltage interval, an output power command value of the power adapter to an output power control value corresponding to the real-time control voltage interval.

According to a second aspect of the present disclosure, there is further provided a power adapter, including: a controller and a filter capacitor; and the controller is configured to: obtain a real-time value of a bus voltage of the power adapter through voltage sampling; match the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals V1 to VN correspond to N different output power control values P1 to PN; and adjust, according to the real-time control voltage interval, an output power command value of the power adapter to an output power control value corresponding to the real-time control voltage interval.

According to a third aspect of the present disclosure, there is further provided an electronic device, including: a processor; and a memory configured to store executable instructions of the processor; wherein the processor is configured to execute the method for controlling the power adapter described in any one of the above first aspects by executing the executable instructions.

It should be noted that the above general description and the following detailed description are merely exemplary and explanatory and should not be construed as limiting of the disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort.

DETAILED DESCRIPTION

Figure 1:
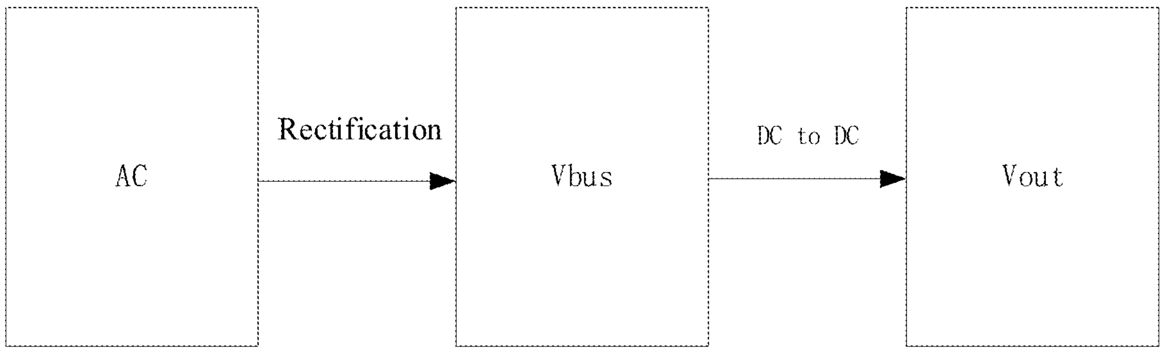
FIG. 1 shows a schematic diagram of a simple architecture of an AC/DC power adapter.

Example embodiments will now be described more fully with reference to the accompanying drawings. However, the example embodiments can be implemented in a variety of forms and should not be construed as being limited to examples set forth herein; rather, these embodiments are provided so that the present disclosure will be more complete and comprehensive so as to convey the idea of the example embodiments to those skilled in this art. The described features, structures or characteristics may be combined in any suitable manner in one or more embodiments.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

As described above, alternating Current (AC)/Direct Current (DC) power adapter architectures typically include two main parts, rectification and DC to DC. As shown in FIG. 1, a function of the rectification is to convert an alternating current to a direct current into a voltage Vbus, and the DC to DC part converts the voltage Vbus to a target voltage Vout. An important indicator for whether an electrical device can operate normally is heat dissipation. A fixed device has its fixed heat dissipation capability. One of conditions for the long-term stable operation of the device is that an overall power consumption of the device does not exceed the maximum heat dissipation capability of the device. For example, when an operating efficiency of a 45 W power supply is 90%, a housing temperature just meets safety regulations and is in a critical state, resulting in a loss of 5 W. This 5 W is the heat dissipation capability of the device, and one of essential conditions that this power supply can be normally used is that the loss is less than 5 W.

For AC/DC power adapters, input voltages are typically 90 to 264 Vac. Generally, the power adapters have the least operating efficiency at 90 Vac inputs, and accordingly, heat dissipation designs depend on whether the 90 Vac condition meets requirements. As for the 45 W power supply in the above example, the operating efficiency is 90% at 90 Vac, resulting in the loss of 5 W, and the housing temperature just meets the requirements. However, in practice, a grid voltage is usually 110 Vac or 220 Vac, and an operating efficiency at this condition is higher than that at 90 Vac. If the power adapter still operates according to the maximum power of 45 W, this will cause a waste of power supply charging capability. It can be seen that resource utilization rates of existing power adapters are not high and there is a problem of wasted charging capability.

Specific implementations of embodiments of the present disclosure will be described in detail below with reference to the accompanying drawings.

Conventional power adapters mainly consider the heat dissipation of full load under specific input conditions, and the maximum output capability of a power supply is defined according to an input voltage condition. For example, for a 45 W power supply with an input voltage of 90 to 264 Vac, the efficiency is 90% at 90 Vac and 50 Hz. According to FIG. 2, a waveform under half a power frequency period is shown, in which the maximum value of an input AC voltage VAC is 90×1.414=127V. As can be seen from FIG. 2, the maximum value of the voltage Vbus is 127V, the minimum voltage of the voltage Vbus is assumed to be 80V, an instantaneous efficiency Pout of the DC to DC stage increases with the increase of an instantaneous value of the voltage Vbus, and the efficiency of 90% is an average efficiency over one power frequency period.

The inventor analyzed the waveform under the above half power frequency period and found that if the average output power over one power frequency period is maintained unchanged, the power consumption is maintained less than a certain value, an instantaneous output power is changed according to the instantaneous value of the voltage Vbus, that is, when the voltage Vbus is high, the output power is increased, and when the voltage Vbus is low, the output power is decreased, and it is ensured that the average power is consistent within one power frequency period, the operating efficiency of the power supply can be improved. That is to say, the voltage Vbus is divided into several levels to ensure the consistent instantaneous loss and total output power, and the instantaneous output power is adjusted according to the instantaneous value of the voltage Vbus.

Figure 3:
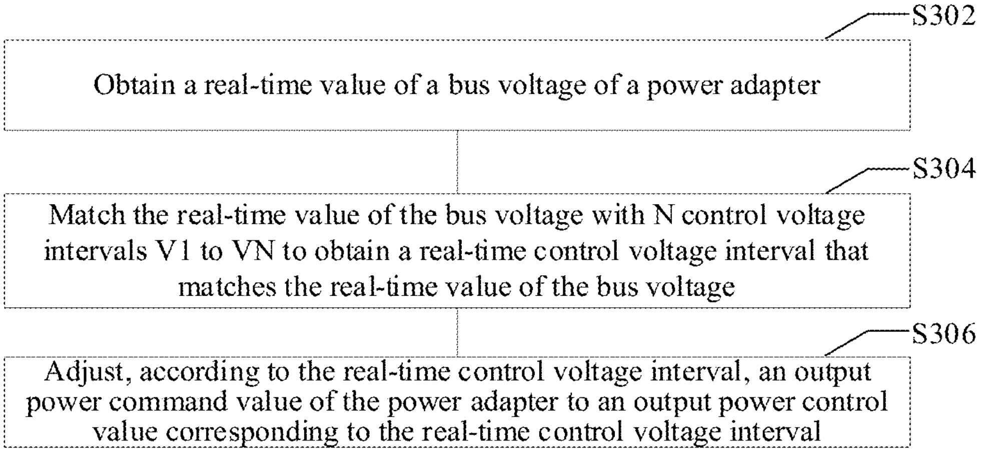
FIG. 3 shows a schematic diagram of a method for controlling a power adapter according to an embodiment of the present disclosure.

Embodiments of the present disclosure provide a method for controlling a power adapter. As shown in FIG. 3, the method includes steps S302 to S306.

In the step S302, a real-time value of a bus voltage of the power adapter is obtained.

It should be noted that the bus voltage refers to the above-mentioned voltage Vbus, and obtaining the real-time value of the bus voltage of the power adapter also means obtaining the real-time value of the voltage Vbus of the power adapter. The voltage Vbus may be monitored in real time by providing a voltage detection device at a bus of the power adapter, to obtain the real-time value of the voltage Vbus.

In the step S304, the real-time value of the bus voltage is matched with N control voltage intervals V1 to VN to obtain a real-time control voltage interval that matches the real-time value of the bus voltage.

Here, N≥2, the N control voltage intervals are continuous and incremental from V1 to VN, and the N control voltage intervals V1 to VN correspond to N different output power control values P1 to PN. It should be noted that a value of N is preset according to an actual input voltage interval, which is not limited in embodiments of the present disclosure. Each control voltage interval corresponds to a respective output power control value.

In the step S306, according to the real-time control voltage interval, an output power command value of the power adapter is adjusted to an output power control value corresponding to the real-time control voltage interval.

It should be noted that the output power command value is not a rated power, and the output power command value refers to a power value that a control chip of the power adapter commands the power adapter to output. Alternatively, the output power command value may be regarded as an average power required within a single control voltage interval. The power adapter uses the output power control value corresponding to the real-time control voltage interval as an actual output power at this time. In an implementation, the output power command value may be adjusted by adjusting a magnitude of an output current.

As seen from the above steps, in the method for controlling the power adapter provided in embodiments of the present disclosure, the obtained real-time value of the bus voltage of the power adapter is matched with the N control voltage intervals V1 to VN to obtain the real-time control voltage interval that matches the real-time value of the bus voltage, and the output power command value at this time is adjusted, based on the real-time control voltage interval, to the output power control value corresponding to the real-time control voltage interval, achieving the real-time regulation of the output power of the power adapter to match the real-time value of the bus voltage, which can reduce the power loss when the bus voltage is at a low voltage. That is, when an output active power of the power adapter remains unchanged, the input power is reduced as much as possible, improving the resource utilization rate of the power adapter and avoiding the waste of charging capability.

In some embodiments of the present disclosure, the N control voltage intervals correspond to N different operating efficiencies, and the higher the voltage, the higher the operating efficiency, and the power adapter has a maximum power loss; and output power control values P2 to PN except a first output power control value P1 corresponding to a first control voltage interval V1 are determined according to N−1 operating efficiencies corresponding to respective control voltage intervals and the maximum power loss.

In some embodiments of the present disclosure, for the output power control values P2 to PN, an output power control value corresponding to a control voltage interval is determined according to the following equation:

$$Pi = \frac{Ploss \times \eta_i}{(1 - \eta_i)} \quad (1)$$

where Pi represents an output power control value of the i-th control voltage interval, and 1<i≤N;

Ploss represents the maximum power loss of the power adapter; and $\eta_i$ represents an operating efficiency of the power adapter corresponding to the i-th control voltage interval.

It should be noted that Ploss refers to the heat dissipation loss under the worst condition for heat dissipation, that is, the power loss when the housing temperature just meets the requirements. $\eta_i$ corresponds to the operating efficiency that can be achieved in each control voltage interval $V_i$, which may be specifically determined based on multiple tests, in which the maximum operating efficiency that the power adapter can achieve at multiple different bus voltages is tested, and the maximum operating efficiency under the median voltage of each voltage control interval may be determined as the operating efficiency of the power adapter corresponding to each voltage control interval.

In some embodiments of the present disclosure, for the output power control value P1, the first output power control value P1 corresponding to the first control voltage interval V1 is determined according to the output power control values P2 to PN corresponding to remaining control voltage intervals V2 to VN except the first control voltage interval V1.

Figure 4:
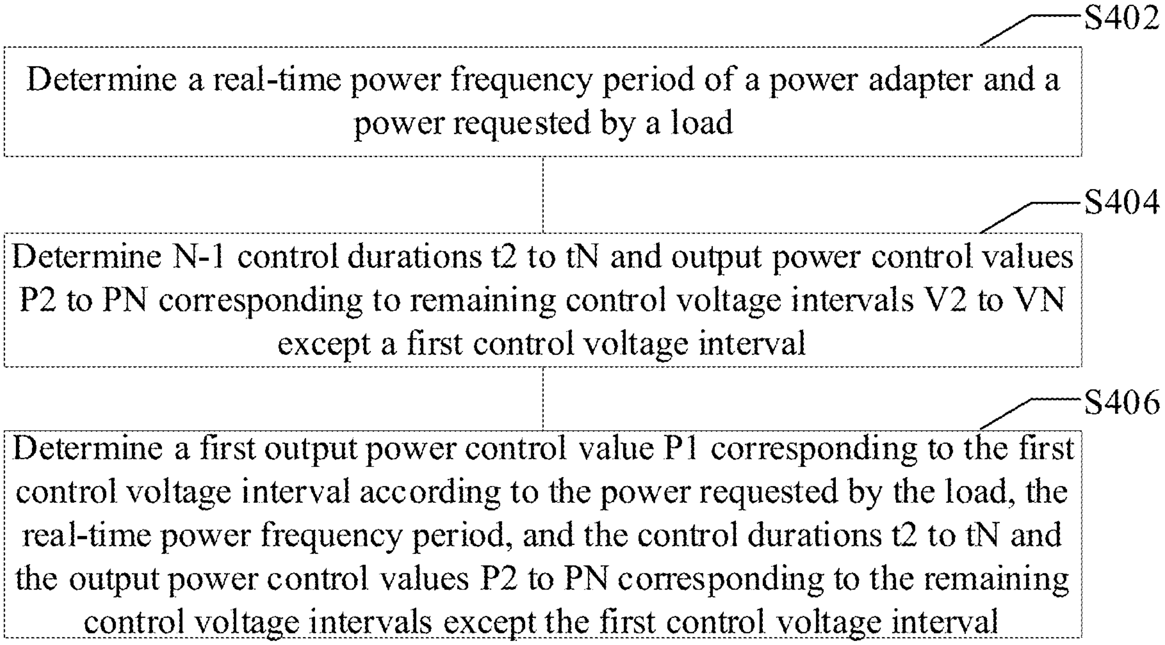
FIG. 4 shows a schematic diagram of a method for determining a first output power control value P1 according to an embodiment of the present disclosure.

Specifically, a method for determining the first output power control value P1 is shown in FIG. 4, and includes steps S402 to S406.

In the step S402, a real-time power frequency period of the power adapter and a power requested by a load are determined.

It should be noted that the real-time power frequency period refers to half a power frequency period of the alternating current input in real time. The power requested by the load refers to an output power that the load requires the power adapter to provide. For example, if the power adapter has an output capability of 60 W, and the load requests a power of 30 W from the power adapter, then the power requested by the load is 30 W.

In the step S404, N−1 control durations t2 to tN and output power control values P2 to PN corresponding to remaining control voltage intervals V2 to VN except the first control voltage interval are determined.

Here, the control durations t2 to tN are durations for which the real-time values of the bus voltage are maintained within corresponding N−1 control voltage intervals. In an implementation, the duration of the bus voltage within each of the N−1 control voltage intervals is determined by monitoring the real-time change of the bus voltage. P2 to PN are determined based on the above equation (1).

In the step S406, the first output power control value P1 corresponding to the first control voltage interval is determined according to the power requested by the load, the real-time power frequency period, and the control durations t2 to tN and the output power control values P2 to PN corresponding to the remaining control voltage intervals except the first control voltage interval.

Specifically, according to the following equation, taking the power requested by the load as an average output power over the real-time power frequency period, the first output power control value P1 corresponding to the first control voltage interval is calculated based on the control durations t2 to tN and the output power control values P2 to PN corresponding to the remaining control voltage intervals except the first control voltage interval:

$$P1 = \left(P_0 \times T - \left(\sum_{i=2}^{N} Pi \times ti\right)\right) / \left(T - \sum_{i=2}^{N} ti\right) \quad (2)$$

where, P1 represents the first output power control value corresponding to the first control voltage interval;

$P_0$ represents the power requested by the load;

T represents the real-time power frequency period;

Pi represents the output power control value of the i-th control voltage interval, and 1<i≤N; and ti represents a control duration of the i-th control voltage interval, and 1<i≤N.

Figure 2:
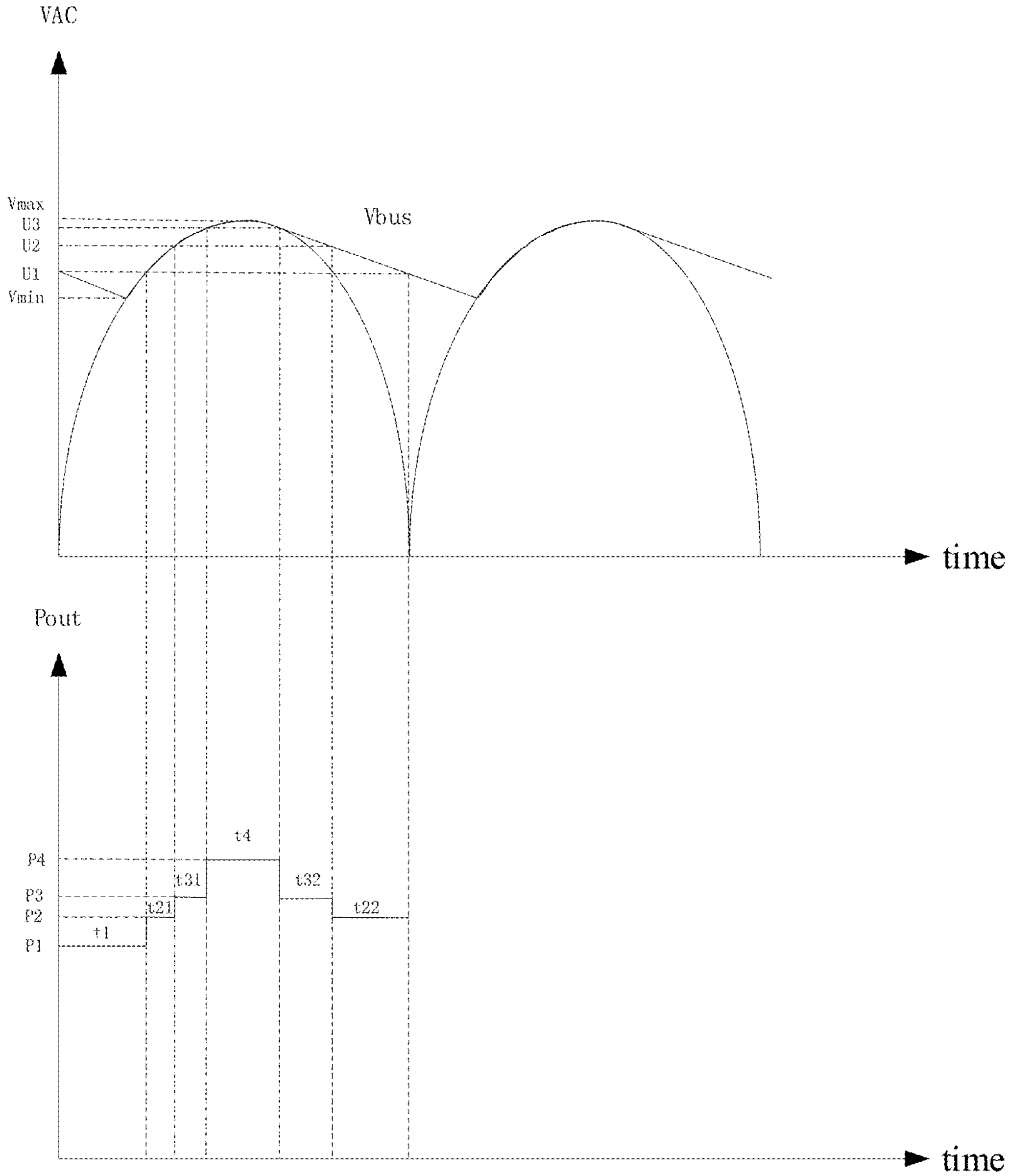
FIG. 2 shows a schematic diagram of a voltage waveform and power distribution of a power adapter according to an embodiment of the present disclosure.

In order to better explain the above determination process for P1 to PN, taking FIG. 2 as an example, it is assumed that the power adapter follows a constant power P, and the maximum power loss of the power adapter is Ploss.

N is set to 4, which means that the output voltage is divided into 4 levels:

(1) when Vbus≥U3, the operating efficiency is η4, the output power command value is adjusted as: P4=Ploss×η4/(1−η4), and the duration is t4;

(2) when U2≤Vbus<U3, the operating efficiency is η3, the output power command value is adjusted as P3=Ploss×η3/(1−η3), and the duration is t3=t31+t32;

(3) when U1≤Vbus<U2, the operating efficiency is η2, the output power command value is adjusted as P2=Ploss×η2/(1−η2), and the duration is t2=t21+t22;

(4) when Vbus<U1, the calculation is based on the unchanged average output power, the duration is t1, and the calculation is based on the power frequency period, the output power command value is adjusted as P1=[P×(t1+t2+t3+t4)−P4×t4−P3×(t3)−P2×(t2)]/t1.

In embodiments of the present disclosure, in the equation (2), P1 is solved by ensuring that the average output power of the power adapter within the power frequency period is equal to the output power command value. This can enable that when the power adapter performs the matching n in accordance with the preset N control voltage intervals V1 to VN, and adjusts the output power command value to the output power control value corresponding to the matching real-time control voltage interval, although the real-time output power is changing, it can be ensured that the average output power output within the power frequency period remains unchanged and is still the rated output power, without affecting the normal operation of the power adapter.

For the N−1 control voltage intervals V2 to VN, the determination of the output power control value is based on the operating efficiency adapted to each control voltage interval, and the operating efficiency adapted to each control voltage interval is greater than a conventional overall operating efficiency of the power adapter. Compared with the conventional power adapter, due to the improvement of the operating efficiency, the loss is correspondingly reduced, reducing the waste of charging capability.

In order to better explain the method for controlling the power adapter provided by embodiments of the present disclosure and the achieved technical effects, an example is now given for further explanation. The example relates to a 45 W AC/DC power adapter design comparison, including an AC/DC power adapter designed by a conventional output power scheduling method and an AC/DC power adapter designed by the method for controlling the power adapter provided by embodiments of the present disclosure.

Figure 5:
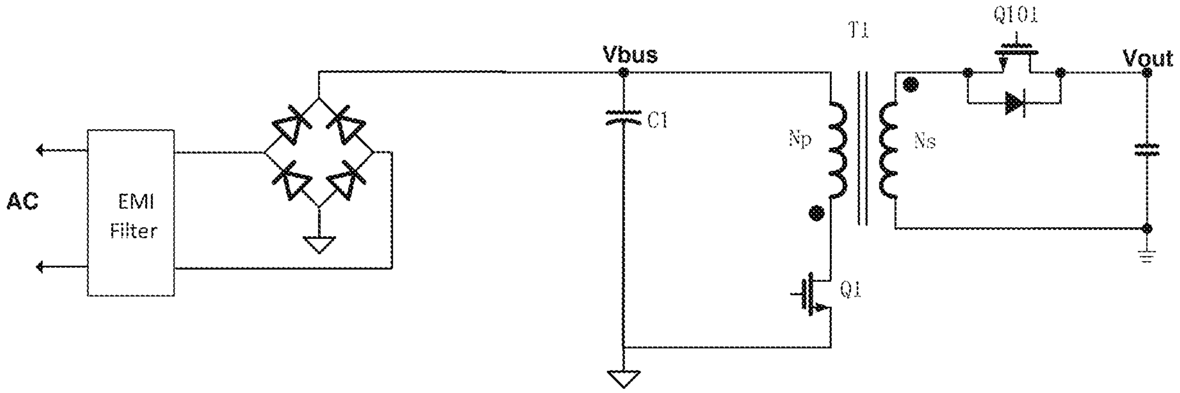
FIG. 5 shows a schematic diagram of a circuit topology in an example of the present disclosure.

A circuit topology of this example is shown in FIG. 5. After an AC input passes through an EMI Filter (which is a power filter) and a rectifier bridge, the AC input is converted into Vbus, and Vbus is subject to the DC-DC conversion to obtain Vout. The power adapter in this example adopts a flyback topology.

The specification conditions of this power adapter are as follows: the input voltage is 90~264 Vac/50~60 Hz, the maximum output condition is 20V, 2.25A, and the maximum heat dissipation power of the housing is 4.5 W.

The conventional output power scheduling method needs to consider the design of the above specifications under the worst condition for heat dissipation, that is, a condition in which the input is 90 Vac, 50 Hz, and the output is 20V, 2.25A, with the constant power output.

From the perspective of power supply reliability, the following basic conditions need to be met: the power consumption of the power supply is less than 4.5 W under the worst condition; and a magnetic flux of a transformer is less than a saturation magnetic flux.

According to a constant output of 45 W, the following parameters are designed:

TABLE 1

45 W power supply parameter design

| Name | Parameter | Note |
|---|---|---|
| Vo | 20 V | Output voltage |
| Io | 2.25 A | Output current |
| C1 | 420 V, 68 uF | Filter capacitor value |
| Inductance of transformer T1 | 750 uH | |
| Number Np of primary turns of transformer T1 | 48 ts | |
| Number Ns of secondary turns of transformer T1 | 8 ts | |
| Transformer core | RM10 | |
| Transformer core center column area | 86.6 $mm^2$ | |

Since the power supply operates in a QR mode (that is, a flyback quasi-resonant mode) and is turned on at a first valley, the efficiency is calculated based on an average value of Vbus within one power frequency period. Operating parameters under 90 Vac and 50 Hz are calculated based on the above design parameters, as shown in Table 2.

TABLE 2

Operating parameter calculation

| Name | Parameter | Note |
|---|---|---|
| Vbus_min | 81.5 V | Minimum of power frequency filter capacitor voltage |
| Vbus_max | 127 V | Maximum of power frequency filter capacitor voltage |
| Vbus_AVG | 104 V | Average of power frequency filter capacitor voltage |
| B_Tl @Vbus_min | 0.315 T | Maximum magnetic flux of transformer |
| f sw_AVG | 46.5 kHz | Average operating frequency within power frequency period |
| M | 1 | Number of QR valleys |
| η_AVG | 90.9% | Power efficiency is calculated based on one power frequency period |

The average efficiency calculated based on one power frequency period is 90.9%, and the loss of the power supply is 45/0.909−45=4.5 W, that is, based on the constant power output over one power frequency period, the power of 45 W can be continuously output under the worst condition with the above design parameters. That is to say, the power adapter designed by the conventional method has the average efficiency of 90.9% in one power frequency period, a loss of 4.5 W, and an output power of 45 W.

In this example, the efficiency is considered based on an instantaneous value of the voltage Vbus, and the following instantaneous operating efficiency table is obtained through multiple tests.

TABLE 3

| Power adapter operating status Vbus | | | | | | | | |
|---|---|---|---|---|---|---|---|---|
| | VAC | | | | | | | |
| | 90 Vac | | | | | 110 Vac | 150 Vac | 220 Vac |
| | Vbus | | | | | | | |
| | 82 V | 90 V | 100 V | 110 V | 120 V | 140 V | 200 V | 300 V |
| η | 89.8% | 90.3% | 90.8% | 91.2% | 91.4% | 92.3% | 93.4% | 93.8% |
| Fsw (operating frequency) | 36 kHz | 40 kHz | 44.5 kHz | 49 kHz | 53 kHz | 60 kHz | 79 kHz | 100 kHz |
| Bmax | 0.315 T | 0.3 T | 0.283 T | 0.27 T | 0.259 T | 0.242 T | 0.212 T | 0.19 T |

Please note that, a standard input voltage of the power adapter is typically 110 Vac and 220 Vac, so only the voltage around voltage levels of 90 Vac/110 Vac/220 Vac is needed to be divided upon design, in order to meet an actual application. η represents the operating efficiency of the power adapter, and Bmax represents the maximum magnetic flux of the transformer.

Through the analysis of the above data, it can be seen that an output capability of the power supply is mainly limited by the condition of Vbus=82V. As Vbus increases, the efficiency of the power supply increases significantly, and the Bmax value decreases significantly. Therefore, through the reasonable distribution of the output power, a high voltage interval of Vbus can be made full use to increase the output power, and the output power and Bmax are reduced in a low voltage interval of Vbus. This can not only improve the output capability of the power supply, but also meet the basic operating condition of the power adapter.

Through the above data, it can be seen that the efficiency changes significantly when the voltage Vbus is smaller than 200V, but does not change significantly when Vbus≥200V. Therefore, the voltage Vbus can be divided into intervals at points where the efficiency changes significantly, and the following intervals are divided as shown in Table 4.

TABLE 4

Interval efficiency division table

| | Interval number | | | | | | |
|---|---|---|---|---|---|---|---|
| | V1 | V2 | V3 | V4 | V5 | V6 | V7 |
| Vbus | <90 | [90, 100] | [100, 110] | [110, 120] | [120, 140] | [140, 200] | >200 |
| η | 90.1% | 90.6% | 91% | 91.4% | 91.7% | 92.8% | 93.5% |

It should be noted that the efficiency corresponding to each control voltage interval needs to be determined according to the median voltage of each voltage interval. For example, for a voltage interval of [100,110], the efficiency is determined according to Vbus=105V The output power control values are allocated starting from the highest voltage interval that meets the requirements, and the output power control value is finally allocated to the interval V1.

Since the input voltage of the power adapter is 90 Vac, the voltage range Vbus is 81.5 to 127V, covering the intervals V1 to V5, a duration of each interval is collected, and an output power control value of each control voltage interval is determined: in the control voltage intervals of V2 to V5, based on the total loss Ploss of 4.5 W, the output power control value can be obtained as Ploss η/(1−η), the power frequency period is 10 ms, and an operating status of each interval is calculated as shown in Table 5.

TABLE 5

Operating status under condition of 90 Vac

| Interval number | V1 | V2 | V3 | V4 | V5 |
|---|---|---|---|---|---|
| Vbus | <90 | [90, 100] | [100, 110] | [110, 120] | [120, 140] |
| η | 90.1% | 90.6% | 91% | 91.4% | 91.7% |
| t | 1.435 ms | 1.93 ms | 2.06 ms | 2.285 ms | 2.29 ms |
| Pout | 34.5 W | 43.4 W | 45.5 W | 47.8 W | 49.7 W |

The durations t corresponding to the intervals V2 to V5 may be sampled through the IC voltage and recorded. Pout of the intervals V2 to V5 may be calculated by Ploss η/(1−η). The duration t of the interval V1 may be obtained by subtracting the sum of the durations corresponding to the intervals V2 to V5 from the power frequency period T. The power frequency period T may be obtained by the times of collecting two peaks of the voltage Vbus. The output power of the interval V1 is obtained by solving the above equation (2).

For the conventional design scheme, the active power generated in half a power frequency period is: 45 W×10 ms=450 mJ. For the new design scheme according to the method for controlling the power adapter provided by embodiments of the present disclosure, the power consumption generated within 10 ms is: [34.5 W/90.1%−34.5 W]×1.435 ms+4.5 W×(10 ms−1.435 ms)=3.79 W×1.435 ms+4.5 W×8.565 ms=43.9 mJ. That is, through the method for controlling the power adapter provided by embodiments of the present disclosure, the loss of the power adapter is reduced to 43.9 mJ, and the efficiency is increased to 91.1%, which is greater than 90.9% in the conventional design scheme.

It can be seen from this that for the fixed power supply provided by this example, changing the output power through the above method for controlling the power adapter can achieve a 0.2% improvement in the efficiency under the worst condition, improving the resource utilization rate of the power adapter.

Furthermore, according to the method for controlling the power adapter provided by embodiments of the present disclosure, an output capability of the power adapter under a high-voltage input condition can also be improved. Another example is now given to explain that the method for controlling the power adapter provided by embodiments of the present disclosure can improve the output capability of the power adapter under the high-voltage input condition.

At a high voltage such as 220 Vac, the operating status of the conventional power adapter is as shown in Table 6.

TABLE 6

Operating status of conventional power adapter under 220 Vac input condition

| Name | Parameter | Note |
|---|---|---|
| Vbus_min | 291 V | Minimum of power frequency filter capacitor voltage |
| Vbus_max | 311 V | Maximum of power frequency filter capacitor voltage |
| Vbus_AVG | 301 V | Average of power frequency filter capacitor voltage |
| B_Tl @Vbus_min | 0.19 T | Maximum magnetic flux of transformer |
| f sw_AVG | 100 kHz | Average operating frequency within power frequency period |
| M | 1 | Number of QR valleys |
| η_AVG | 93.5% | Power efficiency is calculated based on one power frequency period |

According to the operating status shown in the above table, it can be seen that when the output power is 45 W, Bmax is only 0.19 T, and the charging capability of the power adapter is not fully utilized.

According to the control voltage intervals divided by the method for controlling the power adapter provided by embodiments of the present disclosure, the following table is obtained at the 220 Vac input.

TABLE 7 operating status according to method for controlling power adapter at 220 Vac

| Interval number | V7 |
|---|---|
| Vbus | >200 |
| η | 93.5% |
| t | 10 ms |
| Pout | 65 W |
| Bmax | 0.271 T |

It can be seen that at the 220 Vac input, the real-time value of Vbus falls in the interval V7. According to the loss, it can be calculated that the power adapter can output 65 W at this time, which is greater than 45 W, and Bmax of the transformer also meets the requirements. Therefore, the method for controlling the power adapter provided by embodiments of the present disclosure can improve the output capability of the power adapter under the high-voltage input condition.

Furthermore, according to the method for controlling the power adapter provided by embodiments of the present disclosure, the effect of reducing the filter capacitor value under the same output capability can also be achieved. A further example is now given for explanation.

As can be seen from Table 3, for the 45 W power adapter, the maximum magnetic flux in the conventional design scheme occurs at Vbus=82V, and the maximum magnetic flux is Bmax=0.315 T.

As can be seen from Table 5, the output power of the interval V1 changes from 45 W to 34.5 W, and Bmax will decrease. Therefore, at Vbus_min, the filter capacitor value can be reduced under the condition that it is satisfied that Bmax does not exceed the maximum value to reduce the power supply size.

For example, the filter capacitor value of the power adapter in the above example is reduced from 68 uF to 47 uF. After the filter capacitor value is reduced, due to the acceleration of the capacitor discharge speed when the rectifier bridge is not in conduction, the durations of the intervals V2 to V5 will be shortened, without affecting the power distribution in the intervals V2 to V5, but resulting in the increase in the power in the interval V1. The recalculation is shown in the table below.

TABLE 8

Power distribution calculation with C1 = 47 uF under 90 Vac input condition

| Interval number | V1 | V2 | V3 | V4 | V5 |
|---|---|---|---|---|---|
| Vbus | <90 | [90, 100] | [100, 110] | [110, 120] | [120, 140] |
| η | 90.1% | 90.6% | 91% | 91.4% | 91.7% |
| t | 3.315 ms | 1.45 ms | 1.56 ms | 1.765 ms | 1.91 ms |
| Pout | 41.2 W | 43.4 W | 45.5 W | 47.8 W | 49.7 W |

It should be noted that Vbus_min needs to be calculated according to the output condition of 45 W, the filter capacitor value is reduced from 68 uF to 47 uF, Vbus_min is reduced from 82V to 60V, Bmax needs to be calculated according to the output power of the interval V1, and the maximum Bmax needs to be considered according to the adjusted instantaneous power 41.2 W of the interval V1, and the resulting maximum Bmax is 0.33 T. At this time, the operating parameters are shown in Table 9.

TABLE 9

Operating parameters with C1 = 47 uF under 90 Vac input condition

| Name | Parameter | Note |
|---|---|---|
| Vbus_min | 60 V | Minimum of power frequency filter capacitor voltage |
| Vbus_max | 127 V | Maximum of power frequency filter capacitor voltage |
| B_T1@Vbus_min @ 41.2 W | 0.33 T | Maximum magnetic flux of transformer at this time |
| B_T1@ Vbus_min @ 45 W | 0.38 T | Maximum magnetic flux of transformer in conventional design scheme |

It can be seen from Table 9 that according to the conventional design scheme, Bmax under the worst condition is 0.38 T, and the transformer is prone to the saturation risk, which will affect its use. However, according to the method for controlling the power adapter provided by embodiments of the present disclosure, even if the filter capacitor value is reduced, the Bmax under the worst condition is 0.33 T, which enables the safe use. Reducing the filter capacitor value can reduce the size of the filter capacitor, thereby reducing the size of the power adapter. Since the small power adapter is more portable, it will be easier for the user to use.

As can be seen from the above examples, the method for controlling the power adapter provided by embodiments of the present disclosure can not only improve the resource utilization rate of the power adapter, but also can improve the output capability when the input condition remains unchanged, and provide a smaller power adapter while the same output capability is provided.

Based on the same inventive concept, embodiments of the present disclosure further provide a power adapter. Since a principle of solving the problem in the power adapter embodiments is similar to that in the above method embodiments, the implementation of the power adapter embodiments may refer to the implementation of the above method embodiments, and the repeated parts will not be repeated.

Figure 6:
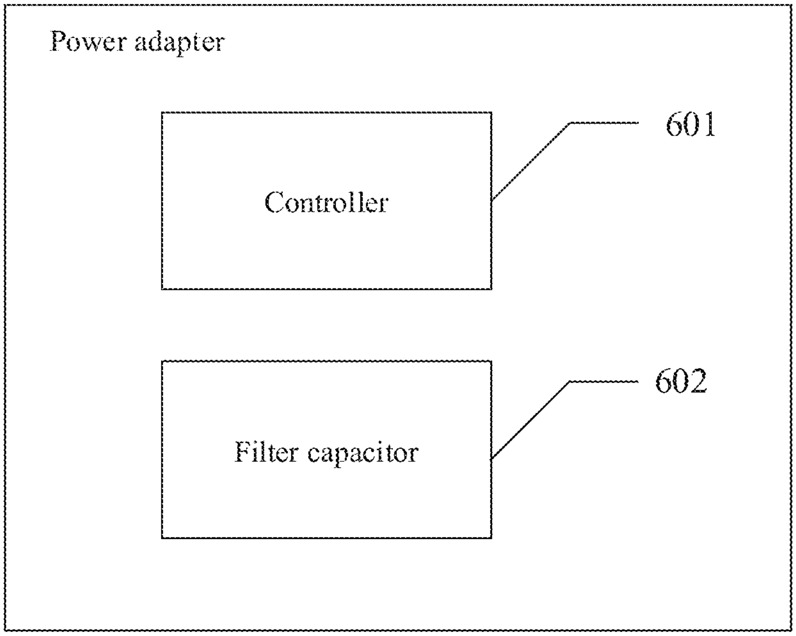
FIG. 6 shows a simple structural schematic diagram of a power adapter according to an embodiment of the present disclosure.

FIG. 6 shows a simple structural schematic diagram of a power adapter according to an embodiment of the present disclosure. As shown in FIG. 6, the power adapter includes a controller 601 and a filter capacitor 602.

The controller 601 is configured to: obtain a real-time value of a bus voltage of the power adapter through voltage sampling; match the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals V1 to VN correspond to N different output power control values P1 to PN; and adjust, according to the real-time control voltage interval, an output power command value of the power adapter to an output power control value corresponding to the real-time control voltage interval.

It should be noted here that the controller 601 corresponds to the steps S302 to S306 in the method embodiments. The examples and application scenarios implemented by the controller 601 and the corresponding steps are the same, without being limited to the content disclosed in the above method embodiments.

In some embodiments of the present disclosure, the N control voltage intervals correspond to N different operating efficiencies, the higher the voltage, the higher the operating efficiency, and the power adapter has a maximum power loss; and the controller 601 is further configured to determine output power control values P2 to PN except a first output power control value P1 corresponding to a first control voltage interval V1 according to N−1 operating efficiencies corresponding to respective control voltage intervals and the maximum power loss of the power adapter.

Further, the controller 601 is further configured to determine an output power control value corresponding to a control voltage interval according to the following equation:

$$Pi = \frac{Ploss \times \eta_i}{(1 - \eta_i)}$$

where Pi represents an output power control value of an i-th control voltage interval, and 1<i≤N;

Ploss represents the maximum power loss of the power adapter; and $\eta_i$ represents an operating efficiency of the power adapter corresponding to the i-th control voltage interval.

In some embodiments of the present disclosure, the controller 601 is further configured to: determine a real-time power frequency period of the power adapter and a power $P_0$ requested by a load; determine N−1 control durations t2 to tN and the output power control values P2 to PN corresponding to the remaining control voltage intervals V2 to VN except the first control voltage interval; and determine the first output power control value P1 corresponding to the first control voltage interval according to the power $P_0$ requested by the load, the real-time power frequency period, and the control durations t2 to tN and the output power control values P2 to PN corresponding to the remaining control voltage intervals except the first control voltage interval. The control durations t2 to tN are durations for which real-time values of the bus voltage are maintained within corresponding N−1 control voltage intervals.

In some embodiments of the present disclosure, the controller is further configured to: use the power $P_0$ requested by the load as an average output power over the real-time power frequency period, and calculate the first output power control value P1 corresponding to the first control voltage interval based on the control durations t2 to tN and the output power control values P2 to PN corresponding to the remaining control voltage intervals except the first control voltage interval according to the following equation:

$$P1 = \left(P_0 \times T - \left(\sum_{i=2}^{N} Pi \times ti\right)\right) \Big/ \left(T - \sum_{i=2}^{N} ti\right)$$

where P1 represents the first output power control value corresponding to the first control voltage interval;

$P_0$ represents the power requested by the load;

T represents the real-time power frequency period;

Pi represents an output power control value of an i-th control voltage interval, and 1<i≤N; and ti represents a control duration of the i-th control voltage interval, and 1<i≤N.

Those skilled in the art can understand that in some embodiments of the present disclosure, the power adapter may further include: a flyback high-frequency transformer, a forward high-frequency transformer, a Logical Link Control (LLC) structure, and circuit structures such as an asymmetric half-bridge circuit, which enables that when the instantaneous value of the filter capacitor voltage (bus voltage) is high, the efficiency can be improved, so that the transformer outputs the greater power, thereby enabling the power adapter to have the greater output capability. The specific circuit structure will not be repeated here.

In order to further explain how to use the power adapter specifically, an example is provided for explanation.

Since an input voltage level of the power adapter is relatively fixed, the controller can divide the control voltage interval in advance and record efficiency values of V1 to VN to form an operating efficiency table. For example, a table similar to that shown in Table 4 can be formed.

The controller obtains the power $P_0$ requested by the load, and a program in the controller sets an initial output power of the power adapter to the rated output power.

The controller obtains and records the maximum value of the voltage Vbus through the voltage sampling, and records a time between two maximum values as the power frequency period T.

The controller determines the duration ti of the i-th interval through a curve obtained by the voltage sampling, and calculates the corresponding Pi, and 1<i≤N.

The controller calculates the duration t1 and P1 of the lowest voltage interval based on the above data.

The controller forms an output power control table in combination with the operating efficiency table.

After forming the output power control table, the controller stores the output power control value used to control the power adapter in real time. After the controller obtains the real-time value of the bus voltage of the power adapter, it first detects whether the maximum value of the voltage Vbus has changed. If there is no change, the controller maintains the table unchanged to match the real-time control voltage interval and determine the output power control value corresponding to the real-time control voltage interval. The controller sends a control command according to the output power control value to cause a current on a secondary or primary side of a transformer at an output end to change, ultimately causing the output power command value of the power adapter to be adjusted to the output power control value corresponding to the real-time control voltage interval. If the maximum value of the voltage Vbus changes, the formed table will not be applicable, and the table needs to be re-formed before control.

Those skilled in the art can understand that various aspects of the present disclosure may be implemented as a system, a method, or a program product. Therefore, various aspects of the present disclosure can be embodied in the following forms: a complete hardware implementation, a complete software implementation (including firmware, microcode, etc.), or a combination of hardware and software implementations, which can be collectively referred to as "circuit", "module", or "system". It should be noted that although several modules or units of devices for executing actions in the above detailed description are mentioned, such division of modules or units is not mandatory. In fact, features and functions of two or more of the modules or units described above may be embodied in one module or unit in accordance with embodiments of the present disclosure.

Alternatively, the features and functions of one module or unit described above may be further divided into multiple modules or units.

In addition, although various steps of the method of the present disclosure are described in a particular order in the figures, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

Through the description of the above embodiments, those skilled in the art will readily understand that the example embodiments described herein may be implemented by software or by a combination of software with necessary hardware. Therefore, the technical solutions according to embodiments of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, mobile terminal, or network device, etc.) to perform the methods in accordance with embodiments of the present disclosure.

Other embodiments of the present disclosure will be apparent to those skilled in the art after those skilled in the art consider the specification and practice the technical solutions disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A method for controlling a power adapter, comprising:

obtaining a real-time value of a bus voltage of the power adapter;

matching the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals V1 to VN correspond to N different output power control values P1 to PN; and adjusting, according to the real-time control voltage interval, an output power command value of the power adapter to an output power control value corresponding to the real-time control voltage interval.

2. The method according to claim 1, wherein:

the N control voltage intervals correspond to N different operating efficiencies, and the power adapter has a maximum power loss; and output power control values P2 to PN except a first output power control value P1 corresponding to a first control voltage interval V1 are determined according to N−1 operating efficiencies corresponding to respective control voltage intervals and the maximum power loss.

3. The method according to claim 2, wherein an output power control value corresponding to a control voltage interval is determined according to the following equation:

$$Pi = \frac{Ploss \times \eta_i}{(1 - \eta_i)}$$

where Pi represents an output power control value of an i-th control voltage interval, and 1<i≤N;

Ploss represents the maximum power loss of the power adapter; and $\eta_i$ represents an operating efficiency of the power adapter corresponding to the i-th control voltage interval.

4. The method according to claim 1, wherein a first output power control value P1 corresponding to a first control voltage interval V1 is determined according to output power control values P2 to PN corresponding to remaining control voltage intervals V2 to VN except the first control voltage interval V1.

5. The method according to claim 4, wherein determining the first output power control value P1 comprises:

determining a real-time power frequency period of the power adapter and a power requested by a load;

determining N−1 control durations t2 to tN and the output power control values P2 to PN corresponding to the remaining control voltage intervals V2 to VN except the first control voltage interval, wherein the control durations t2 to tN are durations for which real-time values of the bus voltage are maintained within corresponding N−1 control voltage intervals; and determining the first output power control value P1 corresponding to the first control voltage interval according to the power requested by the load, the real-time power frequency period, and the control durations t2 to tN and the output power control values P2 to PN corresponding to the remaining control voltage intervals except the first control voltage interval.

6. The method according to claim 5, wherein the first output power control value P1 corresponding to the first control voltage interval is determined according to the following equation:

$$P1 = \left(P_0 \times T - \left(\sum_{i=2}^{N} Pi \times ti\right)\right) / \left(T - \sum_{i=2}^{N} ti\right)$$

where P1 represents the first output power control value corresponding to the first control voltage interval;

$P_0$ represents the power requested by the load;

T represents the real-time power frequency period;

Pi represents an output power control value of an i-th control voltage interval, and 1<i≤N; and ti represents a control duration of the i-th control voltage interval, and 1<i≤N.

7. A power adapter, comprising: a controller and a filter capacitor;

wherein the controller is configured to:

obtain a real-time value of a bus voltage of the power adapter through voltage sampling;

match the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals V1 to VN correspond to N different output power control values P1 to PN; and adjust, according to the real-time control voltage interval, an output power command value of the power adapter to an output power control value corresponding to the real-time control voltage interval.

8. The power adapter according to claim 7, wherein the N control voltage intervals correspond to N different operating efficiencies, and the power adapter has a maximum power loss; and the controller is further configured to determine output power control values P2 to PN except a first output power control value P1 corresponding to a first control voltage interval V1 according to N−1 operating efficiencies corresponding to respective control voltage intervals and the maximum power loss.

9. The power adapter according to claim 8, wherein the controller is further configured to determine an output power control value corresponding to a control voltage interval according to the following equation:

$$Pi = \frac{Ploss \times \eta_i}{(1 - \eta_i)}$$

where Pi represents an output power control value of an i-th control voltage interval, and 1<i≤N;

Ploss represents the maximum power loss of the power adapter; and $\eta_i$ represents an operating efficiency of the power adapter corresponding to the i-th control voltage interval.

10. The power adapter according to claim 7, wherein the controller is further configured to:

determine a real-time power frequency period of the power adapter and a power requested by a load;

determine N−1 control durations t2 to tN and the output power control values P2 to PN corresponding to the remaining control voltage intervals V2 to VN except the first control voltage interval, wherein the control durations t2 to tN are durations for which real-time values of the bus voltage are maintained within corresponding N−1 control voltage intervals; and determine the first output power control value P1 corresponding to the first control voltage interval according to the power requested by the load, the real-time power frequency period, and the control durations t2 to tN and the output power control values P2 to PN corresponding to the remaining control voltage intervals except the first control voltage interval.

11. The power adapter according to claim 10, wherein the controller is further configured to: use the power requested by the load as an average output power over the real-time power frequency period, and calculate the first output power control value P1 corresponding to the first control voltage interval based on the control durations t2 to tN and the output power control values P2 to PN corresponding to the remaining control voltage intervals except the first control voltage interval according to the following equation:

$$P1 = \left(P_0 \times T - \left(\sum_{i=2}^{N} Pi \times ti\right)\right) \Big/ \left(T - \sum_{i=2}^{N} ti\right)$$

where P1 represents the first output power control value corresponding to the first control voltage interval;

$P_0$ represents the power requested by the load;

T represents the real-time power frequency period;

Pi represents an output power control value of an i-th control voltage interval, and 1<i≤N; and ti represents a control duration of the i-th control voltage interval, and 1<i≤N.

12. An electronic device, comprising:

a processor; and a memory configured to store executable instructions of the processor;

wherein the processor is configured to execute the following operations by executing the executable instructions:

obtaining a real-time value of a bus voltage of the power adapter;

matching the real-time value of the bus voltage with N control voltage intervals V1 to VN to obtain a real-time control voltage interval that matches the real-time value of the bus voltage, wherein N≥2, the N control voltage intervals are continuous and incremental from V1 to VN, and the N control voltage intervals V1 to VN correspond to N different output power control values P1 to PN; and adjusting, according to the real-time control voltage interval, an output power command value of the power adapter to an output power control value corresponding to the real-time control voltage interval.

* * * * *